W. J. DEMOREST.
TREADLE.
No. 6,800. Reissued Dec. 14, 1875.
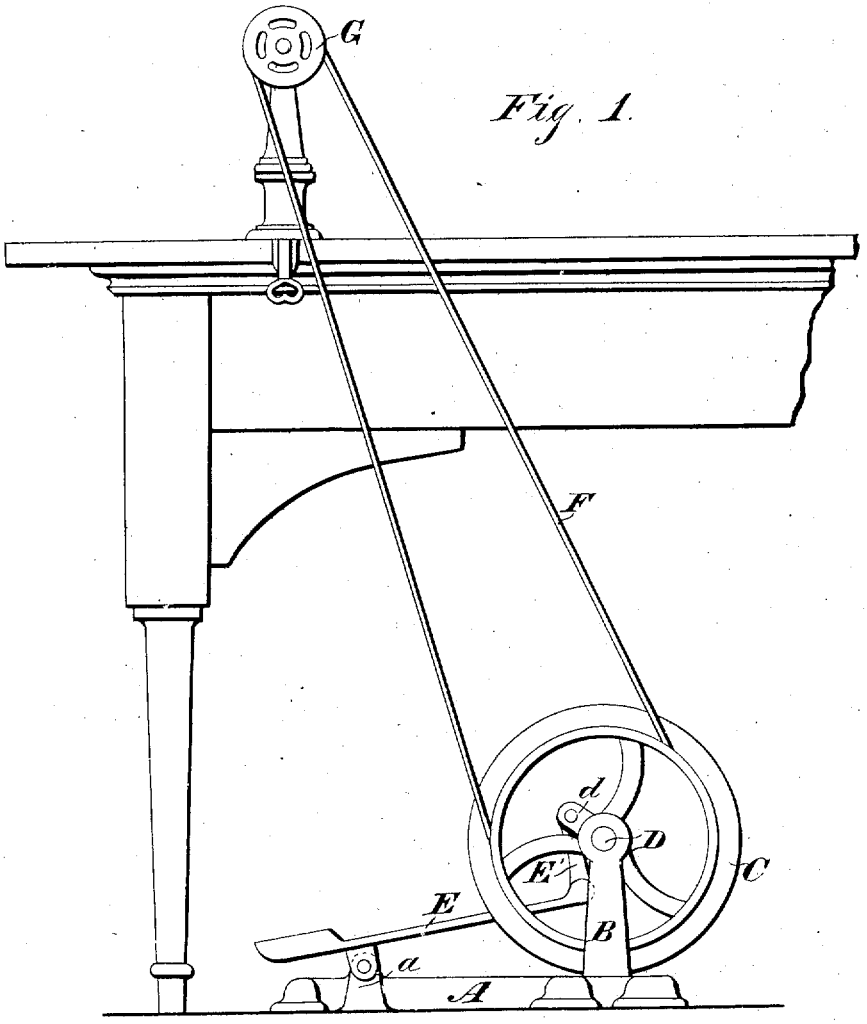
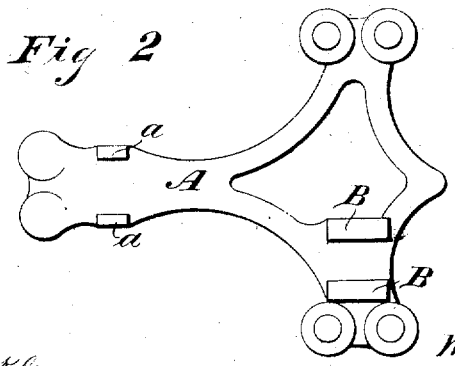
WITNESSES
Wm A Skinkle
Geo Davidson
INVENTOR.
W Jennings Demorest.
By his Attorney
Wm D Baldwin

UNITED STATES PATENT OFFICE.

W. JENNINGS DEMOREST, OF NEW YORK, N. Y., ASSIGNOR, BY MESNE ASSIGNMENTS, TO SAMUEL S. WHITE, OF PHILADELPHIA, PA.

IMPROVEMENT IN TREADLES.

Specification forming part of Letters Patent No. 69,975, dated October 22, 1867; antedated October 12, 1867; reissue No. 6,800, dated December 14, 1875; application filed November 27, 1875.

*To all whom it may concern:*

Be it known that I, W. JENNINGS DEMOREST, of the city, county, and State of New York, have invented certain new and useful Improvements in Treadle-Powers, of which the following is a specification:

The object of this invention is to provide a simple, durable, and portable treadle-power adapted for operating small machinery requiring a steady rotary motion, such as dentists' lathes, sewing-machines, &c., which apparatus may instantly be set up and put in operation, and which, when connected by a belt with the machine it is intended to drive, is self-adjusting relatively to such machine. No apparatus that I am aware of possessing these characteristics existed prior to the date of my invention.

The elements of the combination constituting this invention are a balance and belt wheel and a crank and link attached to a pedal, all these parts being connected with a suitable base, so shaped as to form a firm support for the apparatus.

The subject-matter claimed will hereinafter specifically be designated.

In the accompanying drawings, Figure 1 represents a side elevation of my improved apparatus adapted for operation. Fig. 2 represents a plan or top view of the base or frame of the apparatus with the working parts removed.

The base A is shown in the drawings as made of a T shape. A driving and balance wheel C revolves on a crank-shaft, D, mounted in suitable bearings in standards B on the frame. A pedal, E, rocks in bearings in short posts *a* projecting from the base A, and is connected at its toe with the crank *d* of the crank-shaft D by means of a link, E′. A belt, F, passes from the driving-wheel to a suitable pulley, G, on the machine to be driven.

In working the apparatus it, being unattached to the floor or the support of the driven mechanism will naturally tend to move away from the operator until the distance between the driving-wheel and driven pulley corresponds to the length of the belt, which is thus rendered taut, and its liability to slip prevented as the driving-wheel constantly acts as a tightening-pulley, and the apparatus is thus rendered self-adjusting relatively to the machine it drives—a new and very advantageous feature never before developed in any such apparatus.

Having thus described my invention, what I claim therein as new, and desire to secure by Letters Patent, is—

1. The portable treadle-power hereinbefore described, consisting of the combination of the base or frame, adapted to be moved, its pedal, link, crank-shaft, and balance and driving-wheel, all constructed to operate in combination, substantially as hereinbefore set forth.

2. The combination, substantially as set forth, of the movable treadle-power, the driven pulley, and the driving-belt, whereby the relative position of the treadle-power and the machine driven by it may be varied.

W. JENNINGS DEMOREST.

Witnesses:

MARION H. LEONARD,
JAMES H. TORR.